United States Patent
Kiyomi et al.

(10) Patent No.: US 9,238,337 B2
(45) Date of Patent: Jan. 19, 2016

(54) MOLDING DIE AND MOLDING METHOD

(75) Inventors: Hidenori Kiyomi, Kobe (JP); Shigeaki Kiyomi, Kobe (JP)

(73) Assignee: SEIEI CO., LTD., Hyogo (JP)

( * ) Notice: Subject to any disclaimer, the term of this patent is extended or adjusted under 35 U.S.C. 154(b) by 1195 days.

(21) Appl. No.: 12/674,613

(22) PCT Filed: Aug. 13, 2008

(86) PCT No.: PCT/JP2008/064536
§ 371 (c)(1),
(2), (4) Date: Mar. 31, 2011

(87) PCT Pub. No.: WO2009/025226
PCT Pub. Date: Feb. 26, 2009

(65) Prior Publication Data
US 2011/0175262 A1 Jul. 21, 2011

(30) Foreign Application Priority Data

Aug. 22, 2007 (JP) ................................. 2007-215592
Jul. 15, 2008 (JP) ................................. 2008-183394

(51) Int. Cl.
*B29C 33/04* (2006.01)
*B29C 70/54* (2006.01)
*B29C 33/00* (2006.01)
*B29C 33/38* (2006.01)
*B29C 70/44* (2006.01)

(52) U.S. Cl.
CPC ............ *B29C 70/54* (2013.01); *B29C 33/0011* (2013.01); *B29C 33/04* (2013.01); *B29C 33/3814* (2013.01); *B29C 70/44* (2013.01)

(58) Field of Classification Search
USPC .......................................................... 264/552
See application file for complete search history.

(56) References Cited

U.S. PATENT DOCUMENTS

| 3,743,689 | A | * | 7/1973 | Saladin .......................... 264/510 |
| 4,267,142 | A | * | 5/1981 | Lankheet ....................... 264/510 |
| 4,562,033 | A | * | 12/1985 | Johnson et al. ............... 264/510 |
| 4,872,827 | A | * | 10/1989 | Noda ............................. 425/526 |
| 2002/0003319 | A1 | * | 1/2002 | Story et al. .................... 264/335 |
| 2006/0157208 | A1 | * | 7/2006 | Annacchino ................... 160/371 |

FOREIGN PATENT DOCUMENTS

JP    58-092522   A    6/1983
JP    63-007913   A    1/1988

(Continued)

OTHER PUBLICATIONS

Translation of Munehito et al., JP 2000-176998 A, Jun. 2000.*

*Primary Examiner* — Ryan Ochylski
(74) *Attorney, Agent, or Firm* — Rabin & Berdo, Jr.

(57) ABSTRACT

A molding die is mainly constituted of a die surface shell layer (15) having a die surface (32) responsive to the shape of a composite item and a support (16) supporting the die surface shell layer (15). The die surface shell layer (15) is made of a material having air permeability, and a prepreg material (34) is placed on a die-shaped surface (32) thereof. Then, the prepreg material (34) is covered with a nonpermeable vacuum bag film (35), and a cavity portion (30) of the support (16) is evacuated. The die surface shell layer (15) has air permeability, whereby it follows that air present on the die-shaped surface (32) is also discharged into the cavity portion (30) through the die surface shell layer (15). Consequently, the prepreg material (34) is pressed against the die-shaped surface (32) by the atmospheric pressure outside the vacuum bag film (35), and strongly adheres.

6 Claims, 17 Drawing Sheets

(56) References Cited

FOREIGN PATENT DOCUMENTS

| JP | 3-193315 A | 8/1991 |
| JP | 4-246510 A | 9/1992 |
| JP | 9-193254 A | 7/1997 |
| JP | 2000-176998 A | 6/2000 |

* cited by examiner

MOLDING DIE AND MOLDING METHOD

BACKGROUND OF THE INVENTION

1. Field of the Invention

The present invention relates to a molding die and a molding method, and more particularly, it relates to a molding die and a molding method employed for molding a composite item.

2. Description of the Background Art

In general, a composite item is manufactured by autoclave molding of a prepreg material of glass fiber, carbon fiber, aramid fiber or the like, or hybrid fiber of glass fiber, carbon fiber, aramid fiber or the like. In the autoclave molding, a molding die manufactured by machining a metallic material such as an aluminum material or a low-expansion metallic invar, or an epoxy resin mold or a nickel electroformed mold inversion-manufactured from a master model of synthetic wood or the like is used.

In molding, the prepreg material is set on a die-shaped surface of such a molding die in an autoclave, and the prepreg material is thereafter covered in order of a peel ply, a bleeder cloth and a vacuum bag film. A stud to which a vacuum pipe is coupled is passed through the vacuum bag film and set in contact with the outer edge of the bleeder cloth. Then, the interior of the autoclave is set to a high pressure (0.3 to 0.7 MPa), and evacuation is performed through this vacuum pipe. Thus, air around the prepreg material is discharged through the peel ply and the bleeder cloth, and the prepreg material adheres to the die surface with pressurization from the outer surface of the bleeder cloth.

Then, the temperature in the autoclave is increased to a prescribed level (at least 100° C.), and this state is held for a constant time. Thus, the prepreg material is hardened in a state deformed into a desired shape. When the hardening terminates, a composite item is manufactured by extracting the prepreg material from the autoclave and releasing the item from the molding die.

The aforementioned conventional autoclave molding is premised on the use of the high-priced autoclave, and hence the cost for the composite item increases. Further, it follows that the autoclave is occupied for a constant time including the rise and fall times of the temperature, and it cannot be said that productivity is excellent. In addition, evacuation of the prepreg material is performed in the autoclave, and hence the adhering situation of the prepreg material to the die surface cannot be sufficiently confirmed. Particularly in a large-sized composite item, it is not easy to increase adhesiveness of a central portion by evacuation with the stud, and hence there is a possibility of reducing the yield of the item.

The present invention has been proposed in order to solve the aforementioned problems, and an object thereof is to provide a molding die and a molding method improving the quality and the productivity of a composite item without employing an autoclave.

SUMMARY OF THE INVENTION

In order to attain the aforementioned object, a molding die according to a first aspect of the present invention is a molding die employed for molding a composite item, including a die surface shell layer having air permeability for setting a composite on a die-shaped surface thereof, and a support having a cavity portion provided on the back surface side of the die surface shell layer for discharging gas passing through the die surface shell layer.

According to this structure, the gas can be stably discharged from the overall surface of the die surface shell layer.

A molding die according to a second aspect of the present invention is a molding die employed for molding a composite item, including a die surface shell layer having air permeability for setting a composite on a die-shaped surface thereof, and a base plate arranged to be in contact with the back surface of the die surface shell layer, while a recess for discharging gas passing through the die surface shell layer is formed on a surface of the die surface shell layer closer to the base plate.

According to this structure, the gas can be stably discharged from the overall surface of the die surface shell layer.

A molding die according to a third aspect of the present invention further includes a temperature control pipe provided on the back surface side of the die surface shell layer for controlling the temperature of the die surface shell layer in the structure of the invention according to the first aspect or the second aspect.

According to this structure, the temperature of the die surface shell layer can be kept at a desired level in molding.

In a molding die according to a fourth aspect of the present invention, the die surface shell layer is provided with at least one pore corresponding to an opening area of 1 to 400 μm in hole diameter per surface area of 100 cm$^2$ in the structure of the invention according to any of the first aspect to the third aspect.

According to this structure, thermosetting resin of the composite does not penetrate into the pore, but only the gas passes.

In a molding die according to a fifth aspect of the present invention, the air permeability has an air flow rate of at least 0.001 liters/min. per surface area of 1 cm$^2$ under the condition that the pressure difference between the surface side and the back surface side of the die surface shell layer is 0.1 MPa in the structure of the invention according to any of the first aspect to the fourth aspect.

According to this structure, the gas can be promptly discharged.

A molding method according to a sixth aspect of the present invention is a molding method for molding a composite item, including the steps of setting a die surface shell layer having air permeability, setting a composite on the surface of the die surface shell layer, setting a vacuum bag film to completely cover the composite, and discharging gas from the space between the composite and the die surface shell layer through the die surface shell layer.

According to this structure, the composite easily adheres to the die surface shell layer.

A molding method according to a seventh aspect of the present invention further includes the steps of heating and hardening the composite, and releasing the hardened composite from the die surface shell layer by introducing gas into the back surface of the die surface shell layer and performing pressurization in the structure of the invention according to the sixth aspect.

According to this structure, the gas spouts from the die surface shell layer.

A molding method according to an eighth aspect of the present invention is a molding method for molding a composite item, including the steps of setting a die surface cylindrical layer having air permeability and having a cylindrical shape, setting a composite on a sidewall surface of the die surface cylindrical layer, setting a vacuum bag film to completely cover the composite, and discharging gas from the space between the composite and the die surface cylindrical layer through the die surface cylindrical layer.

According to this structure, the composite easily adheres to the sidewall surface of the die surface cylindrical layer.

A molding method according to a ninth aspect of the present invention further includes the steps of heating and hardening the composite, and releasing the hardened composite from the die surface cylindrical layer by introducing gas into the back surface of the die surface cylindrical layer and performing pressurization in the structure of the invention according to the eighth aspect.

According to this structure, the gas spouts from the die surface cylindrical layer.

In a molding method according to a tenth aspect of the present invention, the sidewall surface of the die surface cylindrical layer has such a shape that the diameter gradually increases from one end toward the other end of the die surface cylindrical layer in the longitudinal direction in the structure of the invention according to the ninth aspect.

According to this structure, the inner surface of the composite item is also inclined toward the longitudinal direction.

As hereinabove described, the gas can be stably discharged from the overall surface of the die surface shell layer in the molding die according to the first aspect of the present invention, whereby adhesiveness to the die surface shell layer is improved without particularly pressurizing the outer surface of the composite. Consequently, molding in an autoclave is unrequired. Further, submaterials such as a peel ply, a bleeder cloth and the like are also unrequired.

In the molding die according to the second aspect of the present invention, the gas can be stably discharged from the overall surface of the die surface shell layer, whereby adhesiveness to the die surface shell layer is improved without particularly pressurizing the outer surface of the composite. Consequently, molding in an autoclave is unrequired. Further, submaterials such as a peel ply, a bleeder cloth and the like are also unrequired.

The molding die according to the third aspect of the present invention can keep the temperature of the die surface shell layer at a desired level in molding in addition to the effect of the invention according to the first aspect or the second aspect, whereby the same does not separately require a heating source in molding.

In the molding die according to the fourth aspect of the present invention, thermosetting resin of the composite does not penetrate into the pore in addition to the effect of the invention according to any of the first aspect to the third aspect, whereby discharge of the gas from the space between the composite and the die surface shell layer is stably executed.

In the molding die according to the fifth aspect of the present invention, the gas can be promptly discharged in addition to the effect of the invention according to any of the first aspect to the fourth aspect, whereby productivity is further improved.

In the molding method according to the sixth aspect of the present invention, the composite easily adheres to the die surface shell layer, whereby the outer surface of the composite may not be particularly pressurized.

In the molding method according to the seventh aspect of the present invention, the gas spouts from the die surface shell layer in addition to the effect of the invention according to the sixth aspect, whereby the overall hardened composite can be efficiently released in a short time.

In the molding method according to the eighth aspect of the present invention, the composite easily adheres to the sidewall surface of the die surface cylindrical layer, whereby the outer surface of the composite may not be particularly pressurized.

In the molding method according to the ninth aspect of the present invention, the gas spouts from the die surface cylindrical layer in addition to the effect of the invention according to the eighth aspect, whereby the overall hardened composite can be efficiently released in a short time.

In the molding method according to the tenth aspect of the present invention, the inner surface of the composite item is also inclined toward the longitudinal direction in addition to the effect of the invention according to the ninth aspect, whereby releasing of the hardened composite is more simplified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
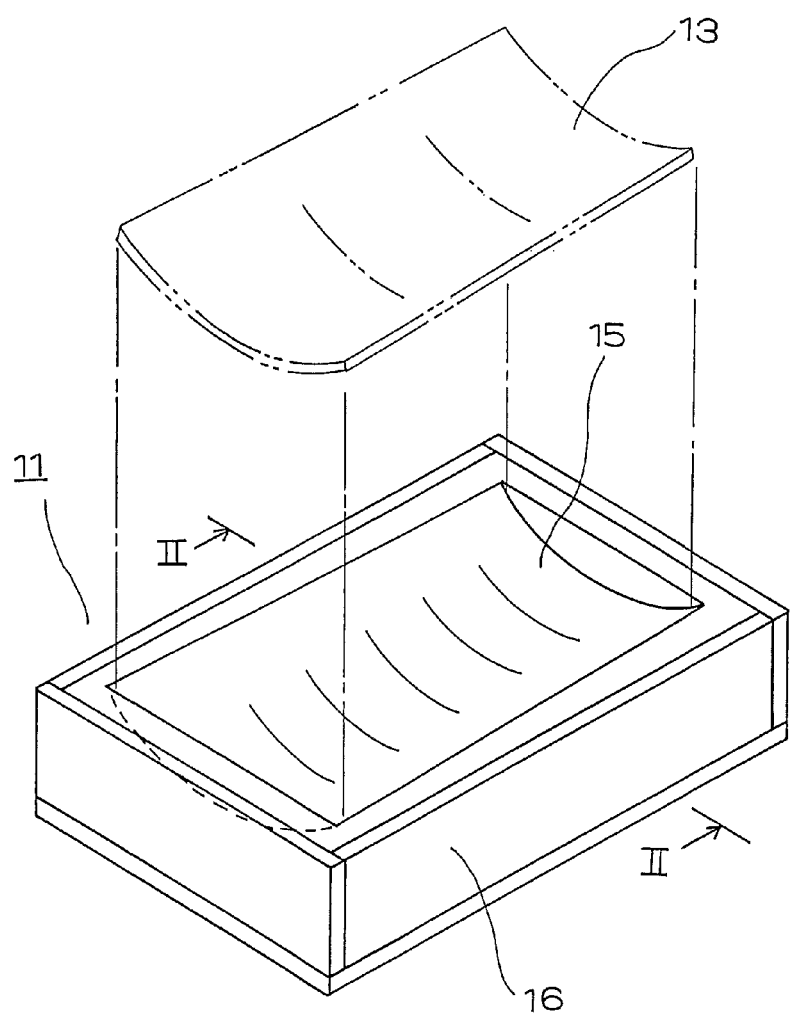
FIG. 1 is a schematic perspective view showing the external shape of a molding die according to a first embodiment of the present invention.
Figure 2:
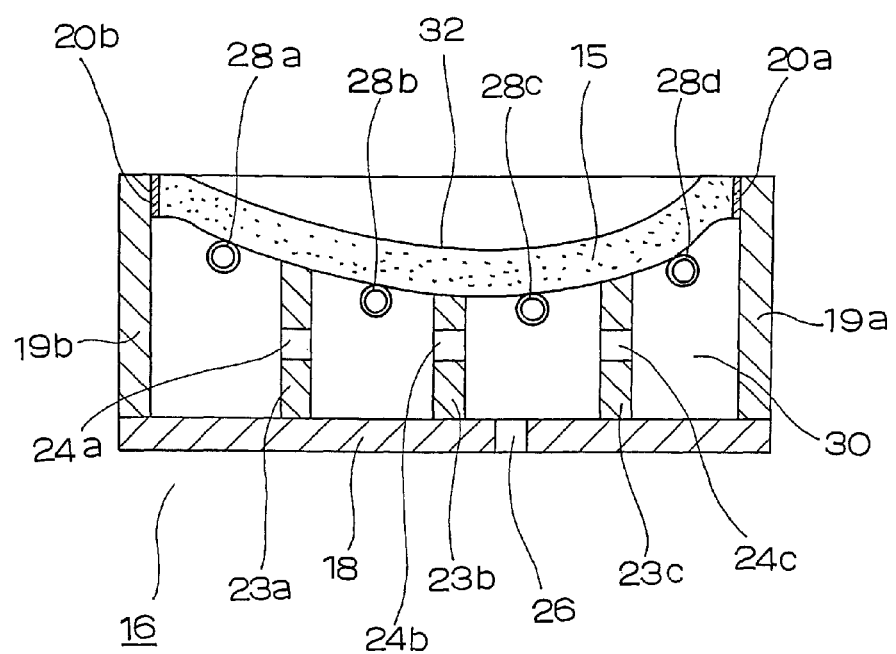
FIG. 2 is a sectional view taken along a line II-II shown in FIG. 1.

FIG. 1 is a schematic perspective view showing the external shape of a molding die according to a first embodiment of the present invention, and FIG. 2 is a sectional view taken along a line II-II shown in FIG. 1.

Referring to these drawings, a molding die 11 is mainly constituted of a die surface shell layer 15 having a die-shaped surface 32 responsive to the shape of a composite item 13 to be molded and a support 16 supporting the die surface shell layer 15. The die surface shell layer 15 is made of a material having air permeability. The support 16 supporting the die surface shell layer 15 is made of a nonpermeable material, and constituted of a base plate 18 in the form of a rectangular flat plate, side plates 19a and 19b rising upward from outer edges of the base plate 18 and connecting to end portions of the die surface shell layer 15 through sealing materials 20a and 20b, and a plurality of reinforcing ribs 23a to 23c arranged between the back surface side of the die surface shell layer 15 and the base plate 18.

Openings 24a to 24c are formed in the respective ones of the reinforcing ribs 23a to 23c, and an opening 26 is formed also in the base plate 18. The support 16 is constituted in this manner, whereby it follows that a sealed cavity portion 30 is formed on the back surface side of the die surface shell layer 15.

A plurality of temperature control pipes 28a to 28d are mounted to be in contact with the back surface of the die surface shell layer 15. The respective ones of these temperature control pipes 28 are so constituted that a liquid kept at a prescribed temperature by an unshown apparatus flows therein.

A surface shell layer prepared by machining an air-permeable porous slab material as such a one that the material itself has air permeability, and a porous nickel electroformed surface shell layer prepared or an air-permeable porous material surface shell layer by reproducing a prescribed surface shape from a master model or the like is used for the die surface shell layer 15. As such a one that the material itself has no air permeability, a surface shell layer consisting of an aluminum plate or a steel plate prepared by drilling at least one air-permeable pore of 1 µm to 400 µm in hole diameter per 100 cm$^2$ may be machined and used as the die surface shell layer 15.

As the air-permeable porous slab material or the air-permeable porous material, a slab material or a porous material prepared by solidifying organic powder or inorganic powder with an organic or inorganic binder, a slab material or a porous material prepared by foaming an organic material or an inorganic material, or a slab material or a porous material prepared by stamping-molding, press-molding or vibration-molding organic powder or inorganic powder and thereafter heat-setting or sintering the same may be used. The slab material or the porous material may simply have at least one air-permeable pore corresponding to an opening area of 1 µm to 400 µm in hole diameter per 100 cm$^2$.

As the air permeation quantity of the die surface shell layer 15, it is preferable that the air flow rate in one minute per surface area of 1 cm$^2$ is at least 0.001 liters under the condition that the pressure difference between the die surface shape side and the back surface side is 0.1 MPa since gas can be promptly discharged. Therefore, it follows that a proper thickness of the die surface shell layer 15 is decided by the total opening area of the air-permeable pores and the aforementioned air permeation quantity.

The reinforcing ribs 23 are coupled to the die surface shell layer 15 by welding or with a binder based on epoxy resin. While nonpermeable heat-resistant plywood, a phenol plate, a heat-resistant honeycomb plate, an aluminum material or a steel material is employed as the material for the reinforcing rib portions 23, an air-permeable material may also be employed. A method of manufacturing the molding die 11 is described later.

A method of using this molding die 11 is now described.

Figure 3:
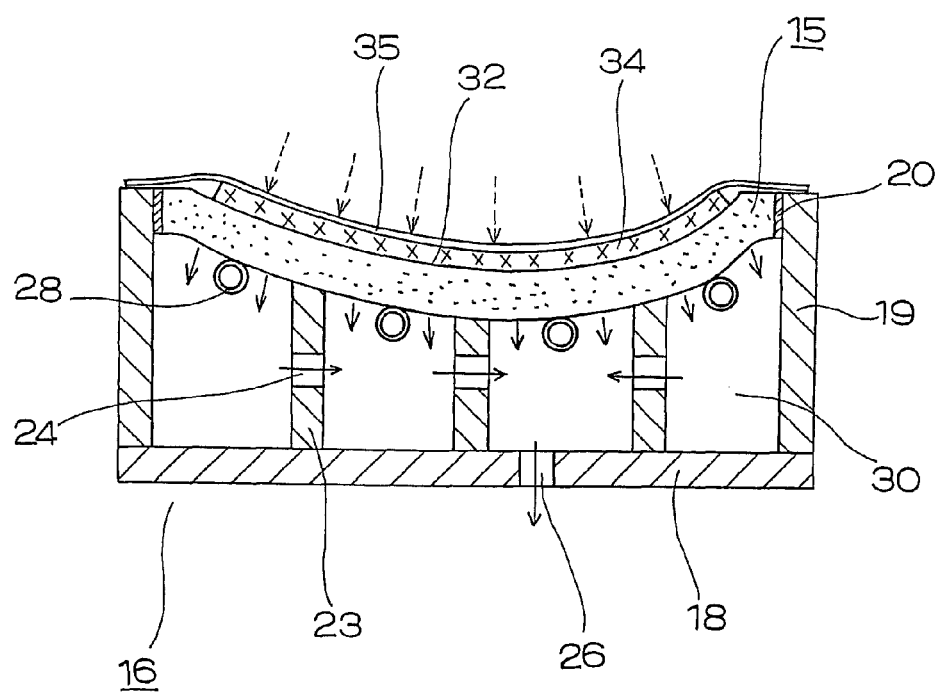
FIG. 3 is a sectional view showing a molding state of the molding die shown in FIG. 1.

FIG. 3 is a diagram corresponding to FIG. 2, and a diagram showing a molding state of a composite item.

Referring to the drawing, a prepreg material 34 is placed on the die-shaped surface 32 (that may also be referred to as a "front surface") of the die surface shell layer 15. Then, a nonpermeable vacuum bag film 35 is set to completely cover the prepreg material 34. At this time, end portions of the vacuum bag film 35 are preferably positioned on the upper surfaces of the side plates 19 of the support 16 to seal the same. In this state, air is present around the prepreg material 34, and hence the degree of adhesion of the prepreg material 34 with respect to the die surface shell layer 15 is not high.

When setting of the prepreg material 34 and the vacuum bag film 35 terminates, an unshown vacuum apparatus is driven to discharge air from the cavity portion 30 through the opening 26 of the support 16. The openings 24 are formed in the respective ones of the reinforcing ribs 23, whereby it follows that the overall air in the cavity portion 30 is discharged as shown by arrow. On the other hand, the die surface shell layer 15 has air permeability as hereinabove described, whereby it follows that air present on the die-shaped surface 32 of the die surface shell layer 15 is also discharged into the cavity portion 30 through the die surface shell layer 15 as shown by arrows. The prepreg material 34 placed on the die-shaped surface 32 of the die surface shell layer 15 is covered with the vacuum bag film 35, whereby the space between the vacuum bag film 35 and the die-shaped surface 32 of the die surface shell layer 15 enters a vacuum state when the discharge of the air from the opening 26 is continued. Therefore, it follows that the outer surface of the vacuum bag film 35 is pressurized by the atmospheric pressure present in the periphery as shown by arrows of broken lines. Consequently, the prepreg material 34 is pressed against the die-shaped surface 32 of the die surface shell layer 15 through the vacuum bag film 35, and strongly adheres.

Depending on the shape of the composite item, the die-shaped surface 32 of the die surface shell layer 15 may have a large step shape or a sharp surface shape. In this case, there is a possibility that the prepreg material 34 does not completely adhere to the die-shaped surface 32 with only the atmospheric pressure applied to the outer surface of the vacuum bag film 35 due to the strong stiffness of the prepreg material 34. In such a case, a caul wood pattern formed in response to the step shape or the like may be set between the prepreg material 34 and the vacuum bag film 35, to bring the interior of the vacuum bag film 35 into the vacuum state as described above. Thus, this portion of the prepreg material 34 completely adheres along the die-shaped surface 32 through the caul wood pattern due to the atmospheric pressure.

A fluid heated to a prescribed temperature is fed to the temperature control pipes 28 arranged on the back surface of the die surface shell layer 15 by an unshown temperature control apparatus in this state, to keep the die surface shell layer 15 at the prescribed temperature for a constant time. Thus, thermal hardening of the prepreg material 34 maintained in a prescribed shape progresses, and the composite item is formed.

Thus, molding can be performed by this molding die 11 in such a state that the periphery is under ordinary pressure, whereby no high-priced autoclave is required. Further, a stable degree of adhesion of the prepreg material 34 to the die surface shell layer 15 can be ensured. In addition, the prepreg material 34 can be temperature-controlled in the molding die 11 itself, whereby no external heat source is separately required.

Releasing of the composite item formed by hardening of the prepreg material 34 is now described.

Figure 4:
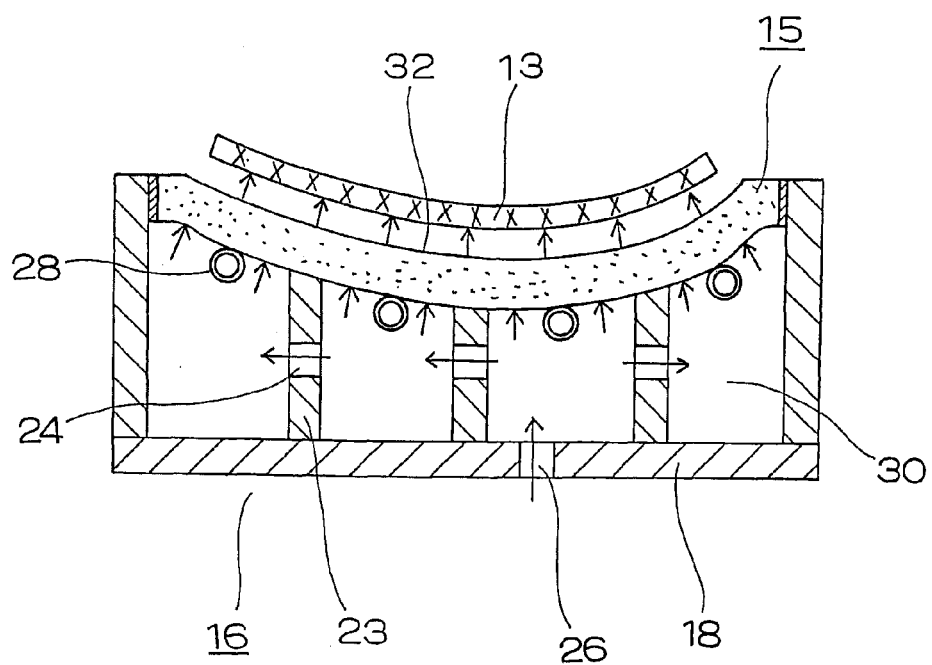
FIG. 4 is a sectional view showing a releasing state of the molding die shown in FIG. 1.

FIG. 4 is a diagram corresponding to FIG. 3, and a diagram showing a releasing state of the hardened composite item.

Referring to the drawing, the vacuum apparatus is stopped when the hardening of the prepreg material 34 terminates and the composite item 13 is molded. The temperature of the heated fluid flowing in the temperature control pipes 28 is controlled by the temperature control apparatus to feed a fluid of ordinary temperature. Thus, the temperatures of the composite item 13 and the die surface shell layer 15 are dropped to ordinary temperature. Then, the vacuum bag film 35 having covered the upper portion of the composite item 13 is removed.

Then, an unshown air supply apparatus is driven to supply compressed air into the cavity portion 30 through the opening 26 of the support 16. The compressed air spreads over the whole of the cavity portion 30 through the openings 24 of the respective ones of the reinforcing ribs 23 as shown by arrows. The die surface shell layer 15 has air permeability as described above, whereby it follows that the compressed air passes through the die surface shell layer 15 from the cavity portion 30, and spouts outward from the die-shaped surface 32 thereof. In other words, the spouting air acts to push up the composite item 13 as shown by arrows, and the composite item 13 is released from the die surface shell layer 15. This spouting air is uniformly spouted from the overall die-shaped surface 32 of the die surface shell layer 15, whereby the composite item 13 can be smoothly released. The pressure of the compressed air is preferably 0.001 to 0.1 MPa in view of releasing efficiency.

Releasing must be successively performed from an end portion of a composite item in conventional autoclave molding, and it has particularly been time-consuming in a case of a large-sized composite item such as an aircraft part or an automobile part, to reduce productivity. In the molding die according to the present invention, the releasing operation extremely smoothly terminates in a short time regardless of the size of the composite item.

Figure 5:
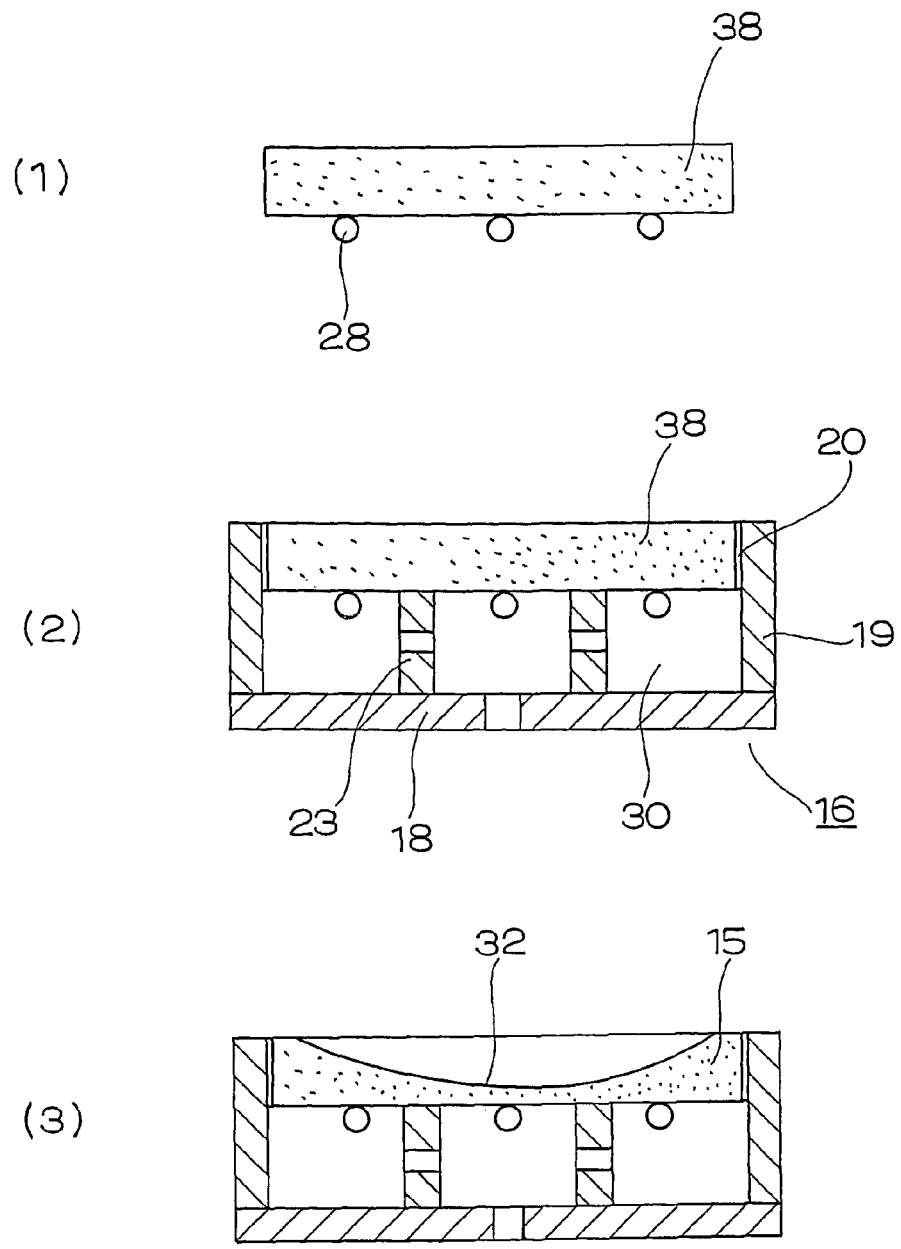
FIG. 5 illustrates schematic step diagrams showing a method of manufacturing the molding die shown in FIG. 1.

FIG. 5 illustrates schematic sectional views typically showing manufacturing steps for the molding die shown in FIG. 1.

Referring to the drawings, a surface shell layer 38 having air permeability is prepared as shown in (1), and the necessary temperature control pipes 28 are set on the lower surface thereof.

Then, the support 16 consisting of the base plate 18, the side plates 19 and the reinforcing ribs 23 is mounted on the surface shell layer 38 as shown in (2). At this time, upper portions of the side plates 19 are connected to end portions of the surface shell layer 38 through the sealing materials 20, to ensure airtightness of the cavity portion 30 in the support 16.

Then, the surface of the surface shell layer 38 is cut by machining to form the die-shaped surface 32 as shown in (3), thereby completing manufacturing of the molding die.

While the present invention is applied to die-molding of the prepreg material as the composite in the aforementioned first embodiment, the present invention can also be similarly applied to an FRP composite item or a honeycomb panel item molded by RTM molding with a composite, VARI molding, fusion molding, infusion molding or vacuum bag molding.

While the cavity portion is provided on the back surface of the mold surface shell layer in the aforementioned first embodiment, this cavity portion designates a substance exhibiting a function of a discharge space for gas passing through the die surface shell layer, and may be another structure.

Further, while the die surface shell layer is formed by machining the surface shell layer in the aforementioned first embodiment, the die surface shell layer may alternatively be formed by reproduction from a master model.

In addition, while the temperature control pipes are provided on the back surface of the die surface shell layer in the aforementioned first embodiment, the temperature control pipes may not necessarily be present. In this case, the composite may be thermally hardened through a heating oven or the like under ordinary pressure. The molding die according to the present invention can be used also in an autoclave if necessary.

Further, while the aforementioned first embodiment is premised on the molding in the air, the present invention can also be similarly applied to molding in an inert gas atmosphere of nitrogen or the like.

Figure 6:
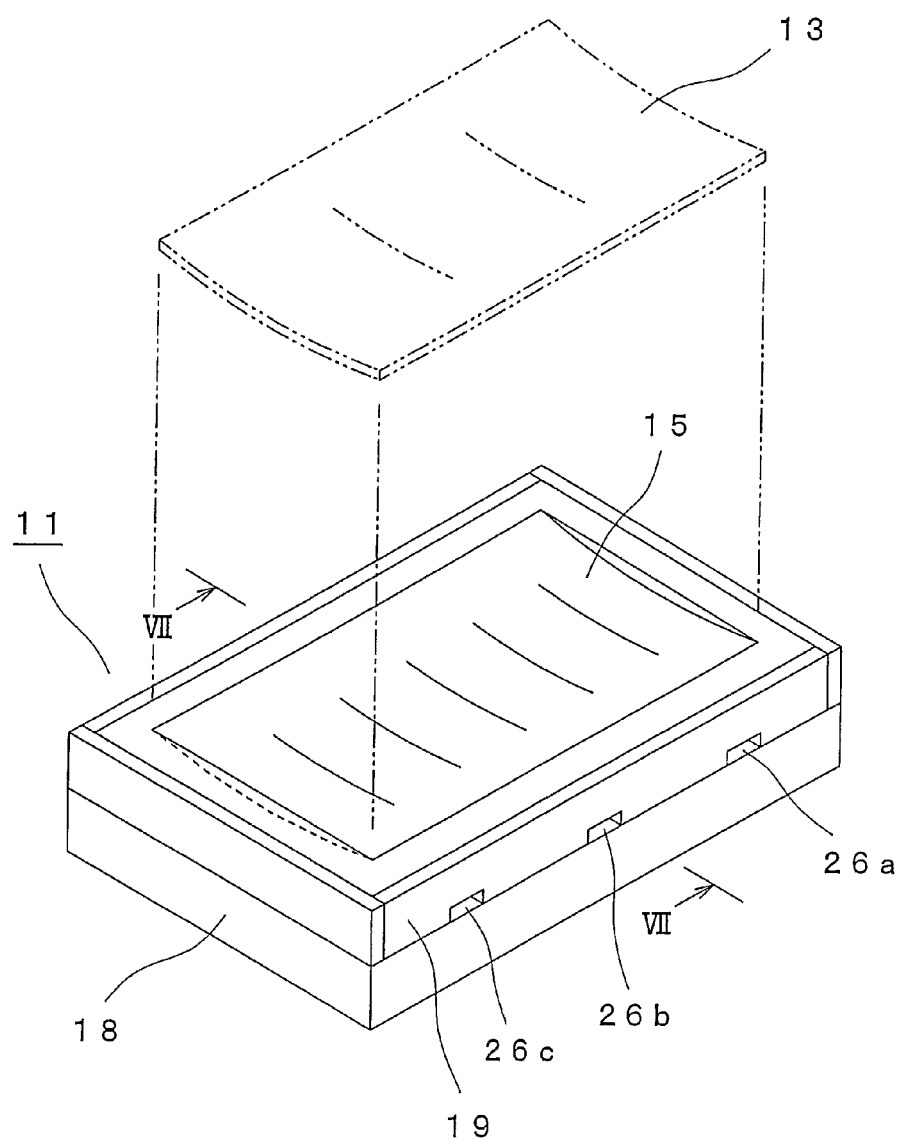
FIG. 6 is a schematic perspective view showing the external shape of a molding die according to a second embodiment of the present invention.
Figure 7:
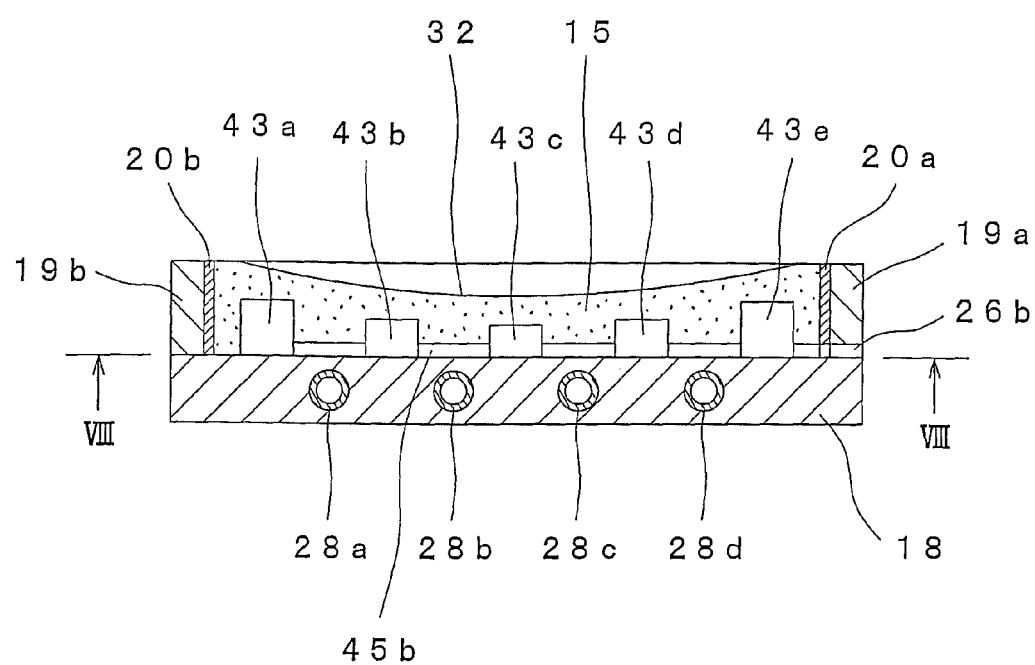
FIG. 7 is an enlarged sectional view taken along a line VII-VII shown in FIG. 6.
Figure 8:
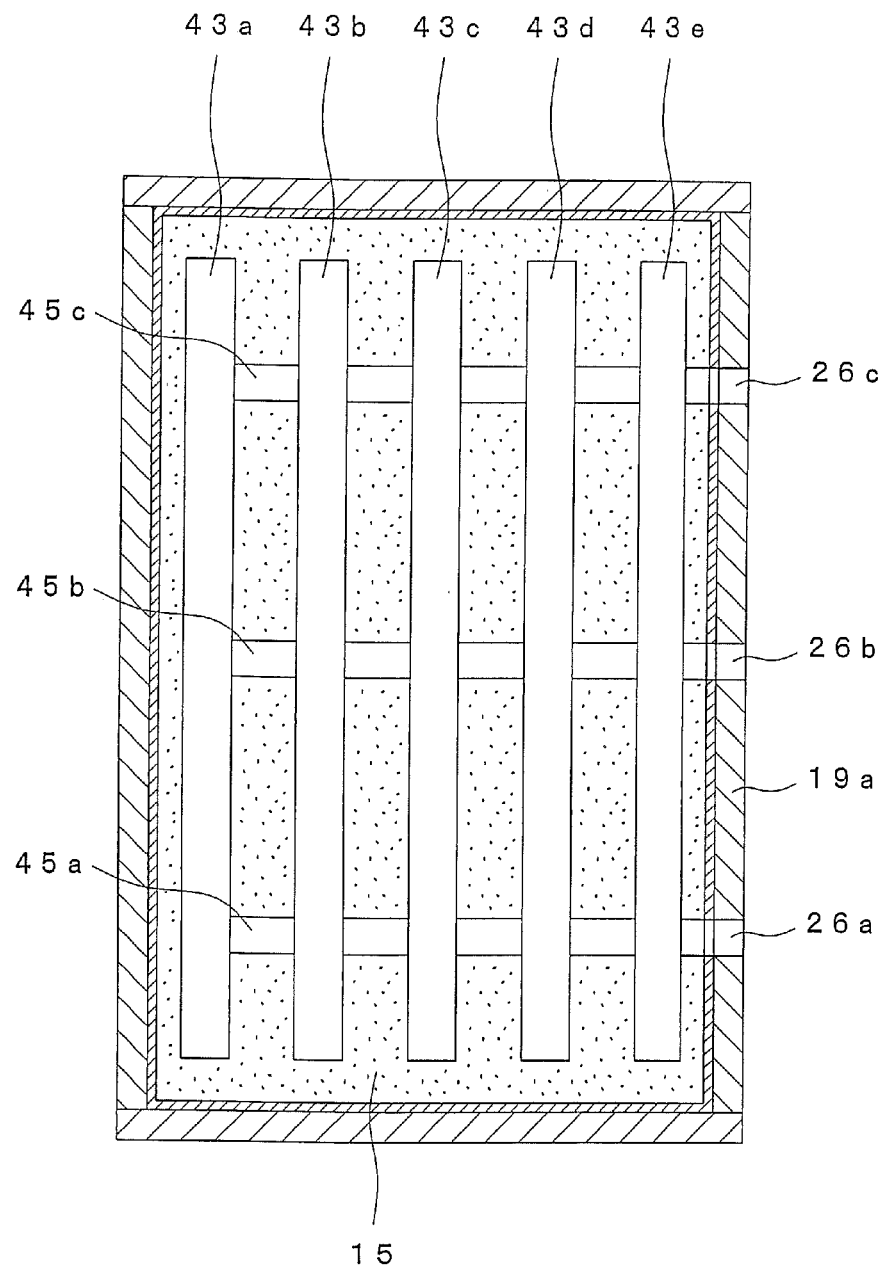
FIG. 8 is a sectional view taken along a line VIII-VIII shown in FIG. 7.

FIG. 6 is a schematic perspective view showing the external shape of a molding die according to a second embodiment of the present invention and a diagram corresponding to FIG. 1 according to the first embodiment, FIG. 7 is an enlarged sectional view taken along a line VII-VII shown in FIG. 6, and FIG. 8 is a sectional view taken along a line VIII-VIII shown in FIG. 7.

Specifications of materials, the using method and the like of this molding die are basically identical to those of the molding die according to the first embodiment, and hence the molding die is described with reference to different points.

Referring to these drawings, the degree of bending of a die surface shell layer 15 is remarkably different. In other words, while the composite item 13 molded by the molding die according to the first embodiment has a relatively large degree of bending, a molding die 11 according to this embodiment is directed to a composite item 13 such as a roof or a hood or an automobile, for example, having a relatively small degree of bending. Therefore, the thickness of the die surface shell layer 15 defined by the highest point and the lowest point is relatively small.

In this embodiment, therefore, a die-shaped surface 32 can be formed on the die surface shell layer 15 by working one surface of a material having a prescribed thickness. Recesses 43a to 43e having depths responsive to worked positions are parallelly formed on the other surface (the back surface) in five rows in the longitudinal direction of the die-shaped surface 32. These recesses 43a to 43e correspond to the cavity portion 30 in FIG. 2, and air can be efficiently discharged through the die surface shell layer 15 having air permeability similarly to the cavity portion 30. Grooves 45a to 45c are formed in a direction orthogonal to the respective recesses 43a to 43e so that the recesses 43a to 43e are brought into air permeation states, and end portions thereof are connected to the respective ones of openings 26a to 26c formed in side plates 19.

Thus, no cavity portion is required in this embodiment, and hence the die surface shell layer 15 is directly set on a thick base plate 18. Temperature control pipes 28a to 28d are embedded in the base plate 18. Thus, the temperature of the die surface shell layer 15 is controlled.

In use, an unshown vacuum apparatus is driven to discharge air from the space between the die surface shell layer 15 and the base plate 18 through the openings 26a to 26c and through the grooves 45a to 45c and the recesses 43a to 34e. The temperature of the die surface shell layer 15 is controlled to a desired condition by feeding a fluid heated to a prescribed temperature to the temperature control pipes 28a to 28d by an unshown temperature control apparatus.

Thus, according to the second embodiment, the die surface shell layer 15 can be substantially thinly formed while no cavity portion may be provided, whereby the molding die is rendered compact as a whole and advantageous in cost.

Figure 9:
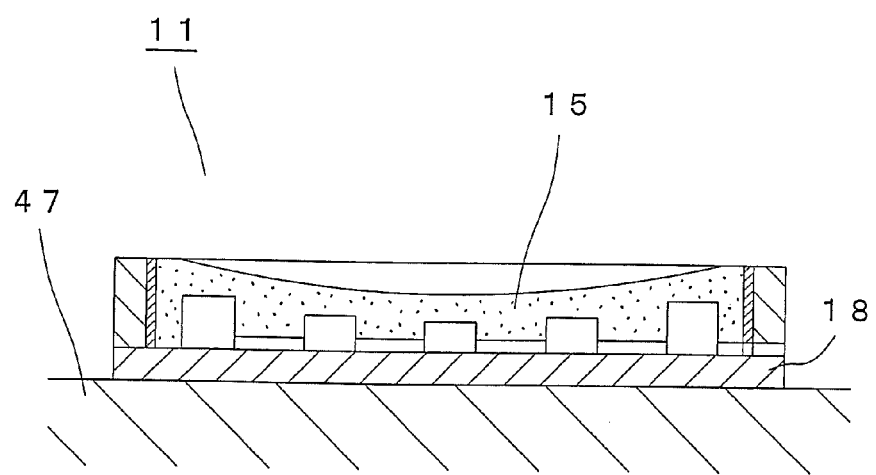
FIG. 9 is a schematic sectional view of a molding die according to a third embodiment of the present invention.

FIG. 9 is a schematic sectional view of a molding die according to a third embodiment of the present invention, and a diagram corresponding to FIG. 7 according to the second embodiment.

This molding die is basically identical to the molding die according to the second embodiment, and hence different points are now described.

Referring to the drawing, portions of a molding die 11 upward beyond a base plate 18 are absolutely identical to the portions of the molding die according to the second embodiment. However, no temperature control pipes are embedded in the base plate 18 according to this embodiment. In place thereof, the base plate 18 is thinly formed, and set on a hot plate 47 in use. Thus, the temperature of the temperature-controlled hot plate 47 is transmitted to a die surface shell layer 15 through the base plate 18, and the die surface shell layer 15 is controlled to a desired temperature in molding.

Figure 10:
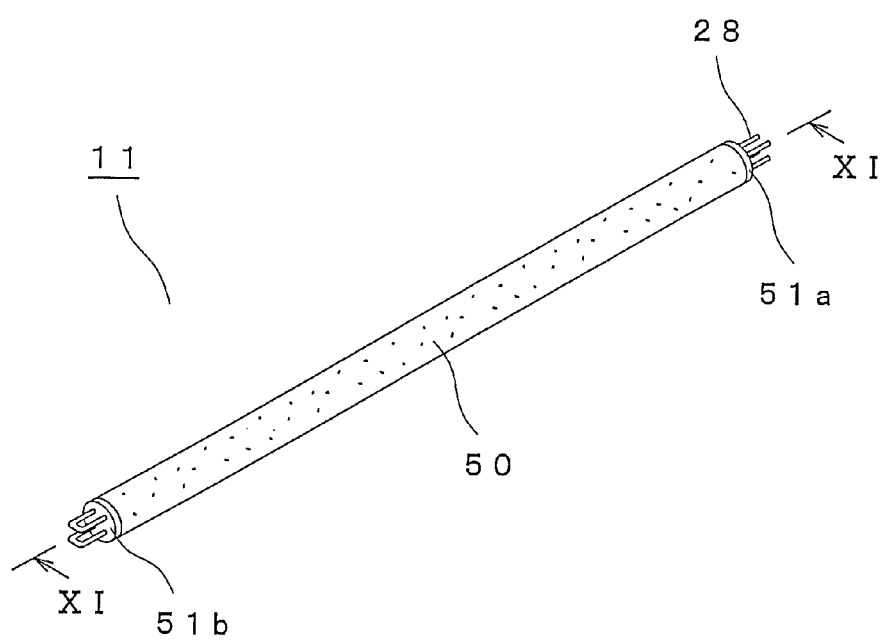
FIG. 10 is a schematic perspective view showing the external shape of a molding die according to a fourth embodiment of the present invention.
Figure 11:
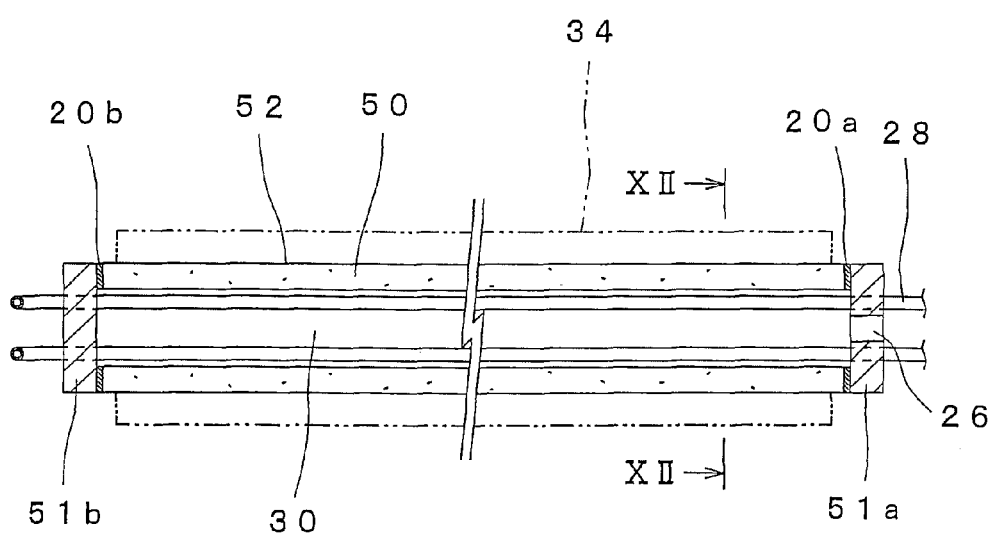
FIG. 11 is an enlarged sectional view taken along a line XI-XI shown in FIG. 10.
Figure 12:
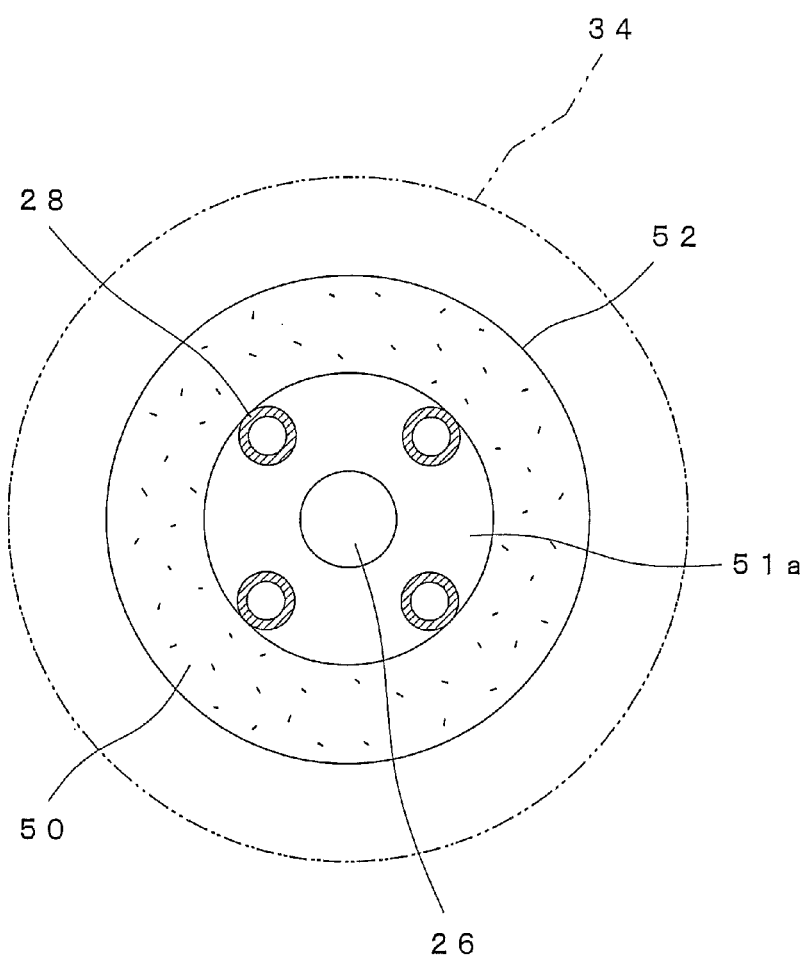
FIG. 12 is an enlarged sectional view taken along a line XII-XII shown in FIG. 10.

FIG. 10 is a schematic perspective view showing the external shape of a molding die according to a fourth embodiment of the present invention, FIG. 11 is an enlarged sectional view taken along a line XI-XI shown in FIG. 10, and FIG. 12 is an enlarged sectional view taken along a line XII-XII shown in FIG. 10.

Referring to these drawings, a die surface cylindrical layer 50 has a long and narrow cylindrical shape, while the material therefor is identical to that for the die surface shell layer 15 according to the preceding first embodiment, and has air permeability. Discoidal cover plates 51a and 51b are mounted on both ends of the die surface cylindrical layer 50 in the longitudinal direction through sealing materials 20a and 20b, to externally seal a cavity portion 30 in the die surface cylindrical layer 50. An opening 26 is formed in the cover plate 51a, and renders the cavity portion 30 and an outer portion ventilable. While a sidewall surface 52 of the die surface cylindrical layer 50 is so formed that the diameter thereof gradually thickens from the side of the cover plate 51b toward the side of the cover plate 51a, the reason therefor is described later.

Temperature control pipes 28 passing through the cover plate 51a are arranged along the inner surface of the die surface cylindrical layer 50 in the cavity portion 30, and set to temporarily go out through the cover plate 51b and thereafter return again while passing through the cover plate 51b, the cavity portion 30 and the cover plate 51a. Two pairs of such temperature control pipes 28 are provided.

This molding die is directed to a cylindrical composite item such as a shaft of a golf club or a fishing rod, for example, relatively thin in diameter (less than 30 mm in diameter) and long.

In use, a prepreg material 34 is set to cover substantially the overall periphery of the sidewall surface 52 of the die surface cylindrical layer 50, as shown in FIGS. 11 and 12. Thereafter a vacuum bag film or the like is set similarly to the first embodiment, and evacuation through the opening 26 and temperature control employing the temperature control pipes 28 are performed, whereby the prepreg material 34 is hardened and the composite item is molded.

When subsequently releasing the molded composite item, compressed air may be similarly supplied from the opening 26 into the cavity portion 30. In this case, the surface of the die surface cylindrical layer 34 is formed in a tapered manner so that the diameter gradually thickens as described above, whereby the composite item moves in the direction smaller in diameter when floating up from the die surface cylindrical layer 34 so that the releasing operation is smoothly performed. The composite item can also be easily extracted from the molding die 11 after the releasing due to the tapered shape of the outer surface of the die surface cylindrical layer 34.

Figure 13:
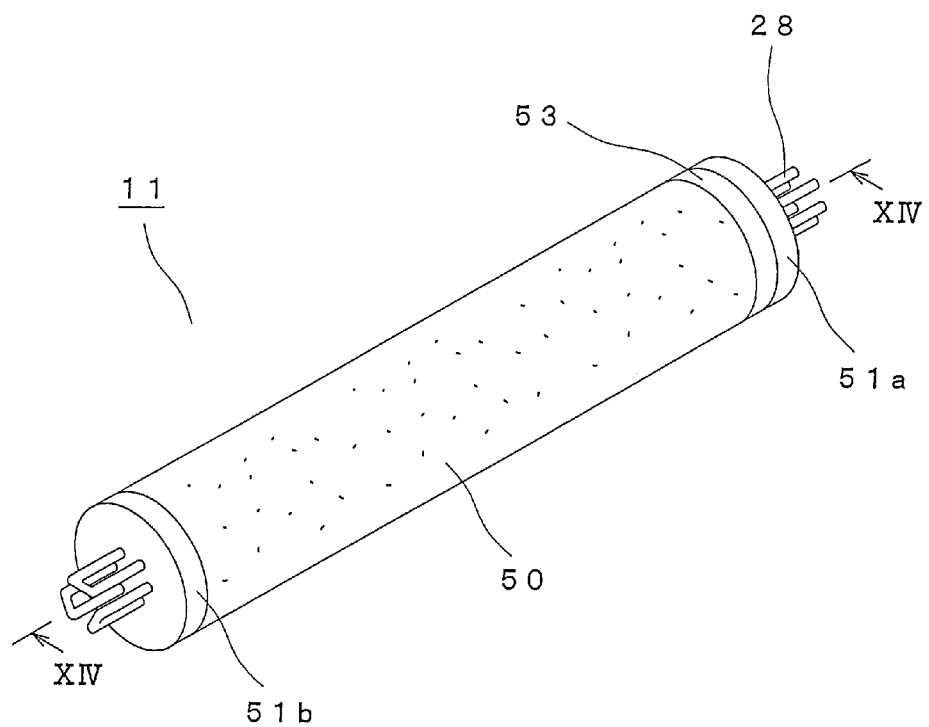
FIG. 13 is a schematic perspective view showing the external shape of a molding die according to a fifth embodiment of the present invention.
Figure 14:
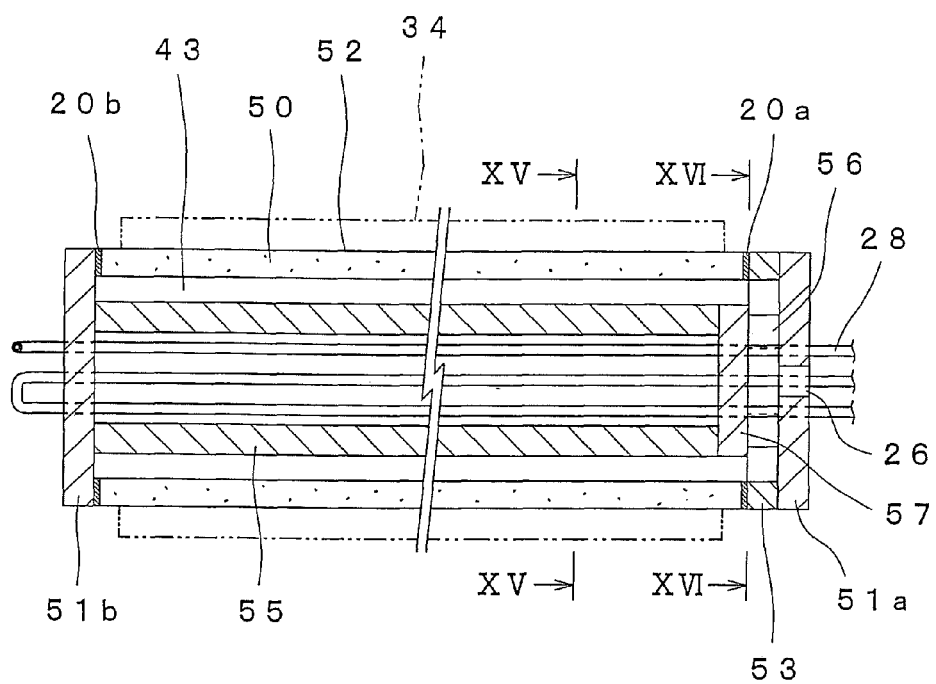
FIG. 14 is an enlarged sectional view taken along a line XIV-XIV shown in FIG. 13.
Figure 15:
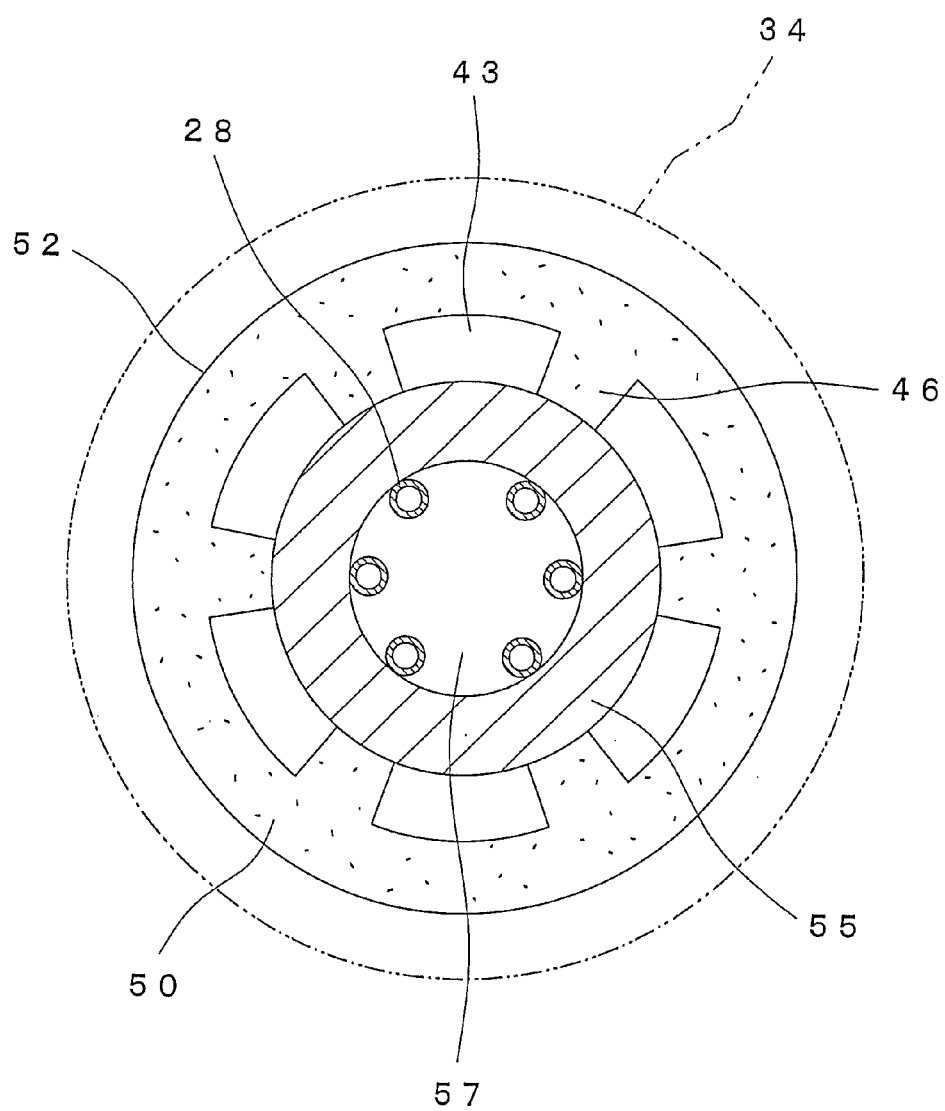
FIG. 15 is an enlarged sectional view taken along a line XV-XV shown in FIG. 14.
Figure 16:
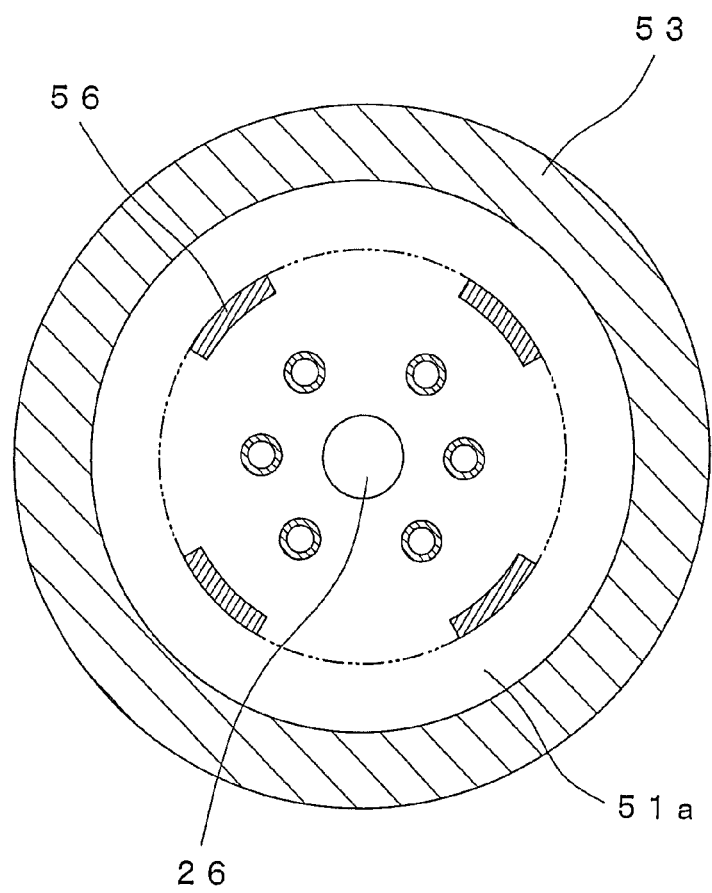
FIG. 16 is an enlarged sectional view taken along a line XVI-XVI shown in FIG. 14.

FIG. 13 is a schematic perspective view showing the external shape of a molding die according to a fifth embodiment of the present invention, FIG. 14 is an enlarged sectional view taken along a line XIV-XIV shown in FIG. 13, FIG. 15 is an enlarged sectional view taken along a line XV-XV shown in FIG. 14, and FIG. 16 is an enlarged sectional view taken along a line XVI-XVI shown in FIG. 14.

Referring to these drawings, while a die surface cylindrical layer 50 has a slightly thick cylindrical shape dissimilarly to the fourth embodiment, the material therefor is identical to that for the die surface shell layer 15 according to the preceding first embodiment, and has air permeability.

In the die surface cylindrical layer 50, a plurality of recesses 43 extending parallelly to each other in the longitudinal direction are formed on the inner surface thereof, and portions 46 between the respective ones of the recesses 43 are mounted to adhere to a sidewall surface of a reinforcing pipe 55 made of a metal. The reinforcing pipe 55 is that for preventing the die surface cylindrical layer 50 from deformation toward the inner surface side or the like in use as described later. One end of the die surface cylindrical layer 50 in the longitudinal direction is mounted on a ring-shaped spacer 53 through a sealing material 20a, and the spacer 53 is integrally mounted on a discoidal cover plate 51a. On the other hand, the other end of the die surface cylindrical layer 50 in the longitudinal direction is integrally mounted on a discoidal cover plate 51b through a sealing material 20b. One end of the reinforcing pipe 55 is connected to the cover plate 51b, while the other end thereof is connected to a discoidal partition plate 57. The partition plate 57 is connected to the cover plate 51a through a plurality of supports 56 having a height corresponding to the width of the spacer 53.

Thus, the recesses 43 in the die surface cylindrical layer 50 are externally sealed. An opening 26 is formed in the cover plate 51a, to render the respective ones of the recesses 43 and an outer portion ventilable through the spacer 53. While a sidewall surface 52 of the die surface cylindrical layer 50 is so formed that the diameter thereof gradually thickens from the side of the cover plate 51b toward the side of the cover plate 51a, the reason therefor is described later.

Temperature control pipes 28 passing through the cover plate 51a further penetrate the partition plate 57 through the portion of the spacer 53, are arranged along the inner surface of the reinforcing pipe 55, and set to temporarily go out through the cover plate 51b and thereafter return again while passing through the cover plate 51b, the inner surface of the reinforcing pipe 55, the partition plate 57, the portion of the spacer 53 and the cover plate 51a. Three pairs of such temperature control pipes 28 are provided.

This molding die is directed to a cylindrical composite item such as the skeleton of a robot, for example, relatively thick in diameter (at least 30 mm in diameter) and short.

In use, a prepreg material 34 is set to cover substantially the overall periphery of the sidewall surface 52 of the die surface cylindrical layer 50, as shown in FIGS. 14 and 15. Thereafter a vacuum bag film or the like is set similarly to the first embodiment, and evacuation through the opening 26 and temperature control employing the temperature control pipes 28 are performed, whereby the prepreg material 34 is hardened and the composite item is molded. The temperature of the temperature control pipes 28 is transmitted to the die surface cylindrical layer 50 through the reinforcing pipe 55, to heat the prepreg material 34 to a desired temperature.

When releasing the molded composite item, compressed air may be similarly supplied from the opening 26 into the recesses 43. In this case, the surface of the die surface cylindrical layer 50 is formed in a tapered manner so that the diameter gradually thickens as described above, whereby the composite item moves in the direction smaller in diameter when floating up from the die surface cylindrical layer 50 so that the releasing operation is smoothly performed. The composite item can also be easily extracted from the molding die after the releasing due to the tapered shape of the outer surface of the die surface cylindrical layer 50.

The reinforcing pipe 55 is mounted on the inner surface of the die surface cylindrical layer 50 in the molding die 11 according to this embodiment. Therefore, the die surface cylindrical layer 50 whose inner surface reaches a low pressure upon evacuation is prevented from deformation, to improve reliability of the molding die 11.

In this embodiment, the recesses 43 extending in the longitudinal direction must be formed on the inner surface of the die surface cylindrical layer 50. If the length of the die surface cylindrical layer 50 increases beyond a prescribed value, however, it is not easy to form the recesses 43.

Figure 17:
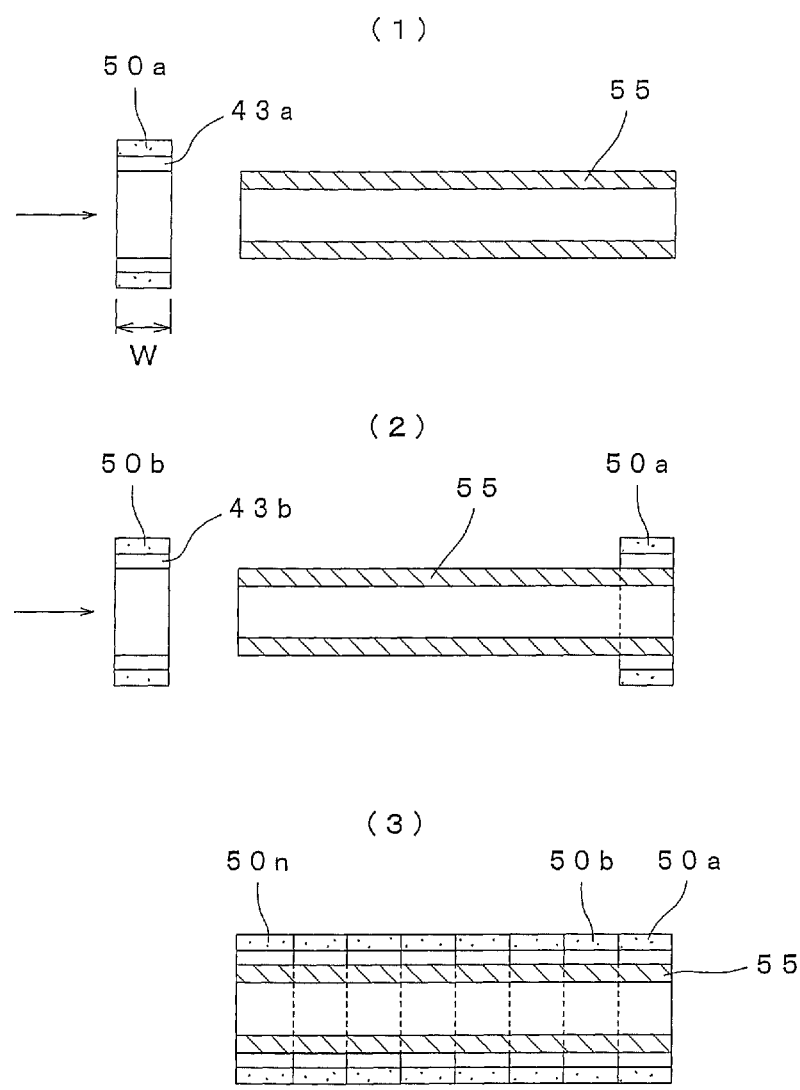
FIG. 17 illustrates step diagrams schematically showing a method of manufacturing the molding die according to the fifth embodiment of the present invention.

FIG. 17 illustrates step diagrams schematically showing a manufacturing method for the molding die according to the fifth embodiment.

Referring to the drawing, the reinforcing pipe 55 is first prepared, and thereafter a die surface cylindrical layer 50a having a width W equally dividing the length of the die surface cylindrical layer in the longitudinal direction into n equally is prepared, as shown in (1). While recesses 43a are already formed in this die surface cylindrical layer 50a, the same can be formed with no problem since the width W is short. In other words, the width W can be decided in a range allowing working of the recesses 43.

Then, the die surface cylindrical layer 50a is passed through the reinforcing pipe 55 and mounted for preparing a die surface cylindrical layer 55b having a similar width W, which is thereafter passed through the reinforcing pipe 55 and mounted to be adjacent to the die surface cylindrical layer 50a, as shown in (2). At this time, the die surface cylindrical layer 50a and the die surface cylindrical layer 50b are integrated with each other with an adhesive or the like.

Then, layers up to a die surface cylindrical layer 50n are successively prepared through a similar process and mounted on the reinforcing pipe, whereby a principal portion of the molding die according to the fifth embodiment is formed, as shown in (3). Thereafter the spacer, the cover plates etc. are mounted, whereby the molding die shown in FIG. 13 is completed.

While the numbers and the layout of the opening 26, the temperature control pipes 28 and the recesses 43 are specified in the aforementioned second embodiment, these may be freely set.

While the numbers and the layout of the opening 26 and the recesses 43 are specified in the aforementioned third embodiment, these may be freely set.

Further, while the number and the layout of the temperature control pipes 28 are specified in each of the aforementioned fourth and fifth embodiments, these may be freely set.

In addition, while the sidewall surface of the die surface cylindrical layer is inclined in each of the aforementioned fourth and fifth embodiments, the sidewall surface may not be inclined.

Further, while the partition plate is provided in the aforementioned fifth embodiment, the partition plate may not be provided.

EXAMPLE 1

This Example 1 is based on a molding die premised on the aforementioned first embodiment.

"METAPOR HD210AL" by Portec (Switzerland) was employed for a slab material as a die surface shell layer 15. This slab material was machined through CAD working data for a die surface shape. After superposing 10 plies of a CF prepreg material TR3110-381GMX by Mitsubishi Rayon Co., Ltd. on a die-shaped surface 32 of the die surface shell layer 15, the overall die surface was covered with a vacuum bag film 35. Generally used sealing materials were used to bond/seal the outer periphery of this vacuum bag film 35 and side plates 19 of aluminum on the die outer periphery supporting the die surface shell layer 15.

Then, evacuation was performed from a hose coupled to a vacuum pump through a vacuum pipe mounted on an opening 26 of a base plate 18 of a support 16 of each molding die 11. Thus, a carbon prepreg material 34 was brought into a vacuum state from the back surface of the die surface shell layer 15, and thereafter the whole of this molding die 11 was introduced into an ordinary heating oven, and the said prepreg material was hardened/molded over a prescribed time at a prescribed temperature. Thereafter the overall molding die 11 including a composite item 13 was cooled to room temperature after canceling the vacuum state.

Then, the used vacuum bag film 35 was removed, and thereafter compressed air of 0.03 MPa was introduced through the vacuum pipe mounted on the base plate 18. Thus, the hardened composite item 13 was released from the molding die 11 by passing the compressed air toward the side of the die-shaped surface 32 from the back surface of the die surface shell layer 15.

EXAMPLE 2

This Example 2 is based on the molding die according to the aforementioned first embodiment.

"METAPOR HD210AL" by Portec (Switzerland) was employed for a slab material as a die surface shell layer 15, and this slab material having temperature control pipes 28 set on the back surface was integrated with reinforcing ribs 23 made of an aluminum material with a heat-resistant epoxy resin binder. A die surface shape of this slab material was worked similarly to Example 1.

Then, after superposing 10 plies of a CF prepreg material TR3110-381GMX by Mitsubishi Rayon Co., Ltd. on a die-shaped surface 32, the overall die surface was covered with a vacuum bag film 35. Generally used sealing materials were used to bond/seal the outer periphery of this vacuum bag film 35 and side plates 19 of aluminum on the die outer periphery supporting the die surface shell layer 15.

Then, evacuation was performed similarly to Example 1, and thereafter regulatory oil heated to a prescribed temperature was injected into temperature control pipes 28 for hardening/molding the prepreg material 34 over a prescribed time at a prescribed temperature. Thereafter regulatory oil of room temperature was injected into the temperature control pipes 28 after canceling the vacuum for cooling the whole of a molding die 11 including a composite item 13 to room temperature, and the hardened composite item 13 was released from the molding die 11 similarly to Example 1.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

As hereinabove described, the molding die and the molding method according to the present invention are suitable for molding a large-sized composite item such as an aircraft part or an automobile part and a cylindrical composite item such as a shaft of a golf club or a fishing rod, for example, relatively thin in diameter.

What is claimed is:

1. A molding method for molding a composite item, comprising the steps:
    providing a die surface shell layer having air permeability, the die surface shell layer having at least one pore having a mean opening pore diameter of 12 μm per surface area of 100 cm$^2$ of the die surface shell layer;
    setting a composite directly on a front surface of said die surface shell layer;
    setting a vacuum bag film to completely cover said composite;
    discharging gas from a space between said composite and said die surface shell layer through said die surface shell layer;
    heating the die surface shell layer to a prescribed temperature;
    maintaining the die surface shell layer at the prescribed temperature;
    concurrently with the maintaining, heating said composite through said die surface shell layer to harden said composite;
    introducing gas into a back surface of said die surface shell layer to perform pressurization; and
    concurrently with the introducing, releasing the hardened composite from said die surface shell layer by spouting the introduced gas through said die surface shell layer.

2. The molding method according to claim 1, further comprising:
    providing a plurality of temperature control pipes for communicating liquid, the temperature control pipes being closer to the die surface shell layer than to the composite,
    wherein in each of the heating the die surface shell layer, the maintaining the die surface shell layer and the heating said composite, the die surface shell layer is heated by the liquid of the temperature control pipes.

3. The molding method according to claim 2, wherein the air permeability of the die surface shell layer is set so as to allow a flow rate of at least 0.001 liters/minute per surface area of 1 cm$^2$ of the die surface shell layer while a pressure difference between a side that includes the front surface and a side that includes the back surface is 0.1 MPa.

4. The molding method according to claim 1, wherein the air permeability of the die surface shell layer is set so as to allow a flow rate of at least 0.001 liters/minute per surface area of 1 cm$^2$ of the die surface shell layer while a pressure difference between a side that includes the front surface and a side that includes the back surface is 0.1 MPa.

5. A molding method for molding a composite item, comprising the steps:
    providing a die surface shell layer having air permeability, a front surface and a back surface, the die surface shell layer having pores so that the air permeability of the die surface shell layer allows for a flow rate of at least 0.001 liters/minute per surface area of 1 cm$^2$ of the die surface shell layer while a pressure difference between a pressure at the front surface and a pressure at the back surface is 0.1 MPa, the pores having a mean opening pore diameter of 12 μm;
    setting a composite directly on the front surface of said die surface shell layer;
    setting a vacuum bag film to completely cover said composite;
    discharging gas from a space between said composite and said die surface shell layer through said die surface shell layer;
    heating the die surface shell layer to a prescribed temperature;
    maintaining the die surface shell layer at the prescribed temperature;
    concurrently with the maintaining, heating said composite through said die surface shell layer to harden said composite;
    introducing gas into the back surface of said die surface shell layer to perform pressurization; and
    concurrently with the introducing, releasing the hardened composite from said die surface shell layer by spouting the introduced gas through said die surface shell layer.

6. A molding method for molding a composite item, comprising the steps:
    providing a die surface shell layer having air permeability, the die surface shell layer having pores having a mean opening pore diameter of 12 μm;
    setting a composite directly on a front surface of said die surface shell layer;
    setting a vacuum bag film to completely cover said composite;
    discharging gas from a space between said composite and said die surface shell layer through said die surface shell layer;
    heating said composite through said die surface shell layer to harden said composite;
    introducing gas into a back surface of said die surface shell layer to perform pressurization; and
    concurrently with the introducing, releasing the hardened composite from said die surface shell layer by spouting the introduced gas through said die surface shell layer.

* * * * *